United States Patent
Biggs et al.

(10) Patent No.: US 7,752,554 B2
(45) Date of Patent: Jul. 6, 2010

(54) BOT IDENTIFICATION AND CONTROL

(75) Inventors: Todd S. Biggs, Kirkland, WA (US);
Campbell D. Gunn, Redmond, WA (US); Michael D. Smith, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 336 days.

(21) Appl. No.: 11/538,976

(22) Filed: Oct. 5, 2006

(65) Prior Publication Data

US 2008/0086522 A1    Apr. 10, 2008

(51) Int. Cl.
*G06F 3/00* (2006.01)
(52) U.S. Cl. .................... 715/752; 715/751
(58) Field of Classification Search ............ 709/202; 715/752, 751, 705–706
See application file for complete search history.

(56) References Cited

U.S. PATENT DOCUMENTS

| | | | |
|---|---|---|---|
| 5,682,539 | A | 10/1997 | Conrad et al. |
| 6,236,975 | B1 | 5/2001 | Boe et al. |
| 6,615,111 | B2 | 9/2003 | Tackett et al. |
| 6,907,571 | B2 * | 6/2005 | Slotznick ............ 715/758 |
| 6,993,555 | B2 | 1/2006 | Kay et al. |
| 7,062,488 | B1 | 6/2006 | Reisman |
| 7,062,561 | B1 | 6/2006 | Reisman |
| 7,139,798 | B2 * | 11/2006 | Zircher et al. ........ 709/204 |
| 2003/0065788 | A1 | 4/2003 | Salomaki |
| 2003/0220972 | A1 * | 11/2003 | Montet et al. ........ 709/204 |
| 2004/0205772 | A1 | 10/2004 | Uszok et al. |
| 2005/0027805 | A1 * | 2/2005 | Aoki .................. 709/206 |
| 2005/0108387 | A1 | 5/2005 | Li et al. |
| 2005/0125370 | A1 | 6/2005 | Brennan et al. |
| 2005/0210396 | A1 * | 9/2005 | Galli .................. 715/758 |
| 2006/0101021 | A1 * | 5/2006 | Davis et al. ............ 707/9 |
| 2006/0253584 | A1 * | 11/2006 | Dixon et al. .......... 709/225 |
| 2007/0011270 | A1 * | 1/2007 | Klein et al. .......... 709/217 |

OTHER PUBLICATIONS

Kim, "Ubiquitous Robot", retrieved at <<http://rit.kaist.ac.kr/upload_files/conference/Ubiquitous%20Robot_FuzzyDaysdortmund_Ubibot.doc>>, available at least as early as Aug. 10, 2006, Korea Advanced Institute of Science and Technology, pp. 1-4.

Munneke, et al., "Intelligent Software Robots on the Internet", retrieved on Aug. 14, 2006, at <<http://www/cis/unisa.edu.au/~cisdm/papers/iagents/IntelligentAgentsInternet.html>>, School of Computer and Information Science, University of South Australia, Oct. 12, 1998, pp. 1-52.

Nwana, "Software Agents: An Overview", retrieved on Aug. 14, 2006, at <<http://www.sce.carleton.ca/netmanage/docs/AgentsOverview/ao.html>>, Cambridge University Press, 1996, pp. 1-53.

(Continued)

*Primary Examiner*—Kieu Vu
*Assistant Examiner*—Darrin Hope
(74) *Attorney, Agent, or Firm*—Lee & Hayes, PLLC

(57) ABSTRACT

Various embodiments employ methods and techniques to enable users, and others, to manage or otherwise become more informed about applications or bots with which they interact. The methods and techniques, in at least some embodiments, can provide various types of indications, visual or otherwise, that pertain to various types of ratings that can be assigned to applications or bots and which can enable a user and others to assess the propriety, level and nature of their interaction with an application or bot.

17 Claims, 11 Drawing Sheets

OTHER PUBLICATIONS

Tanaka, et al., "Animated Agents that Understand Natural Language and Perform Actions", retrieved at <<http://www/miv.t.u-tokyo.ac.jp/pricai02-LAA/papers/tanaka-hozumi.pdf>>, available at least as early as Aug. 10, 2006, Tokyo Institute of Technology, New York University, pp. 6.

\* cited by examiner ated applications that interact with other users in different ways. For example, in some environments, such as web-based, over a text messaging network or presence-based networks, bots can assume a persona or identification and can converse with individuals in real-time. Specifically, bots can typically initiate or participate in conversations, perform file sharing functions and take part in a host of other activities (e.g., control applications, take action on local/remote machines, etc.).

BOT IDENTIFICATION AND CONTROL

BACKGROUND

Robots or "bots" (also known as agents) are automated applications that interact with other users in different ways. For example, in some environments, such as web-based, over a text messaging network or presence-based networks, bots can assume a persona or identification and can converse with individuals in real-time. Specifically, bots can typically initiate or participate in conversations, perform file sharing functions and take part in a host of other activities (e.g., control applications, take action on local/remote machines, etc.).

Yet, in many instances, users may be unaware, at least initially, that they are conversing with a bot. Further, even if the user is aware that they are conversing with a bot, the user may know nothing about the bot such as whether the bot is legitimate or is posing as a legitimate bot for nefarious purposes.

SUMMARY

Various embodiments employ methods and techniques to enable users, and others, to manage or otherwise become more informed about applications or bots with which they interact. The methods and techniques, in at least some embodiments, can provide various types of indications, visual or otherwise, that pertain to various types of ratings that can be assigned to applications or bots and which can enable a user and others to assess the propriety, level and nature of their interaction with an application or bot.

DETAILED DESCRIPTION

Overview

Figure 1:
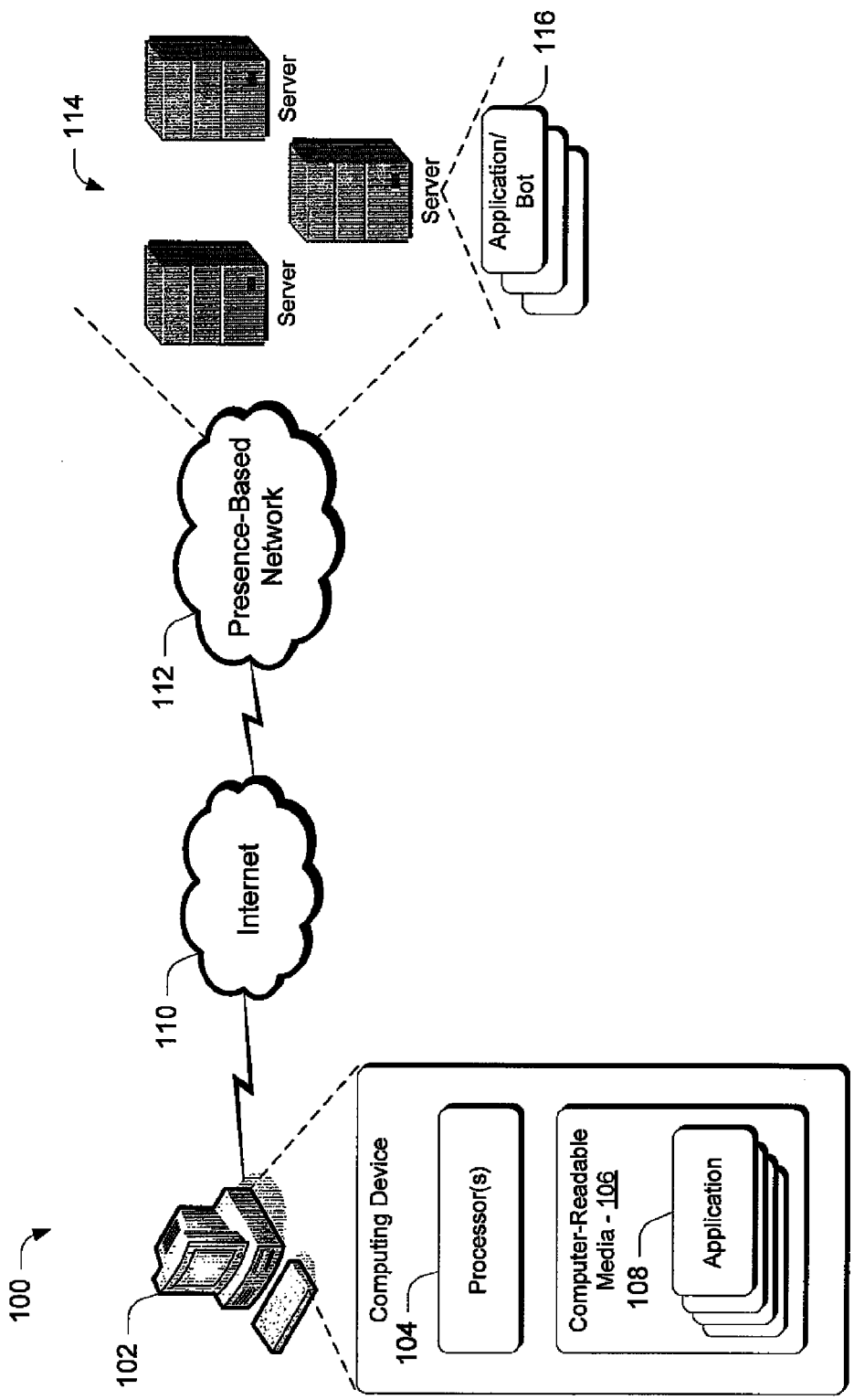
FIG. 1 illustrates a system that includes a presence-based network in accordance with one embodiment.

Various embodiments described below employ methods and techniques to enable users, and others, to manage or otherwise become more informed about applications or bots with which they interact. The methods and techniques, in at least some embodiments, can provide various types of indications, visual or otherwise, that pertain to various types of ratings that can be assigned to applications or bots and which can enable a user and others to assess the propriety, level and nature of their interaction with an application or bot.

In the embodiments described below, these methods and techniques are described in the context of a so-called presence-based application or network in which a user can interact with applications in the form of bots. It is to be appreciated and understood that principles of the described embodiments can be employed in the context of any suitable environment in which a user interacts, in a generally real-time manner, with an application or bot. For purposes of this document, a "bot" will be understood to constitute one type of a software application.

In the discussion that follows, the notion of a presence-based network is first described to provide the reader who is unfamiliar with such networks and associated presence-based applications some context for appreciating the described embodiments. Following this, a discussion of the inventive embodiments in the context of a presence-based network is provided.

Presence In General

The notion of presence typically implies the use of a server or service that runs and keeps online users updated with each other's contacts' online status. That is, in a presence-based network, users can identify so-called contacts—the same or similar to those that appear in the user's email address list. Whenever a contact is online, the presence-based network notifies the user so that the user can leverage the services provided by the network—such as instant messaging, peer-to-peer file exchange and the like. That is, the presence-based network can enable contacts that are online together to communicate in a real-time fashion.

One commercially-available software product that provides presence capabilities is Microsoft's Windows® Messenger or Microsoft Windows® Live Messenger, although other products are available and can certainly be used in connection with the concepts described in this document. Microsoft's Windows® Messenger is a rich, integrated real-time communications experience in Windows® XP that enables people to effortlessly see, talk, work and play with friends, family and colleagues, whenever and however they choose using their personal computer. Windows( & Messenger also includes presence and notification features to keep users updated when their contacts are online and let users know their current status.

Various embodiments described below can leverage the functionality provided by a presence-based network. It is to be appreciated and understood that Microsoft's Windows® Messenger constitutes but one exemplary application that can be utilized in this context. As such, other applications can be utilized without departing from the spirit and scope of the claimed subject matter. Such other applications may or may not be presence-based.

Exemplary Presence-Based Network

As an example of a presence-based network in accordance with one embodiment, consider FIG. 1 which illustrates such a network or system generally at 100. System 100 includes one or more computing devices 102 each of which includes one or more processors 104, one or more computer-readable media 106 and one or more applications 108 that reside on the computer-readable media and which are executable by the processor(s). In at least one embodiment, one of the applications resides in the form of an instant messaging application, such as Microsoft's Windows® Messenger. In at least some embodiments, computer-readable media 106 can include applications, other than presence-based applications, that can implement the embodiments described herein. Such other applications can include, by way of example and not limitation, web browsers, applets, web or desktop based gadgets, mobile applications, computer games and the like.

Although computing device 102 is illustrated in the form of a desktop computer, it is to be appreciated and understood that other computing devices can be utilized without departing from the spirit and scope of the claimed subject matter. For example, other computing devices can include, by way of example and not limitation, portable computers, handheld computers such as personal digital assistants (PDAs), cell phones and the like.

System 100 also includes a network, such as the Internet 10 that is used by computing device 102 to communicate with a presence-based network 112. Any suitable protocols can be utilized to enable communication between computing device 102 and presence-based network 112.

As shown, presence-based network 112 includes one or more servers 114 that implement the presence environment, as will be appreciated by the skilled artisan. The presence-based network can be one that includes or supports the use of instant messaging, VoIP, voice clips and the like—all of which can permit a user of computing device 102 to communicate with the network and other users of the network such as humans and bots. Instant messaging, VoIP and voice clip protocols will be understood by the skilled artisan and, for the sake of brevity, are not further described here.

In at least some embodiments, the presence-based network includes one or more applications or bots 116, typically hosted by or on a server 114, which can communicate with a user of computing device 102 (through any suitable means such as instant messaging, email, VoIP, voice clips and the like).

Figure 2:
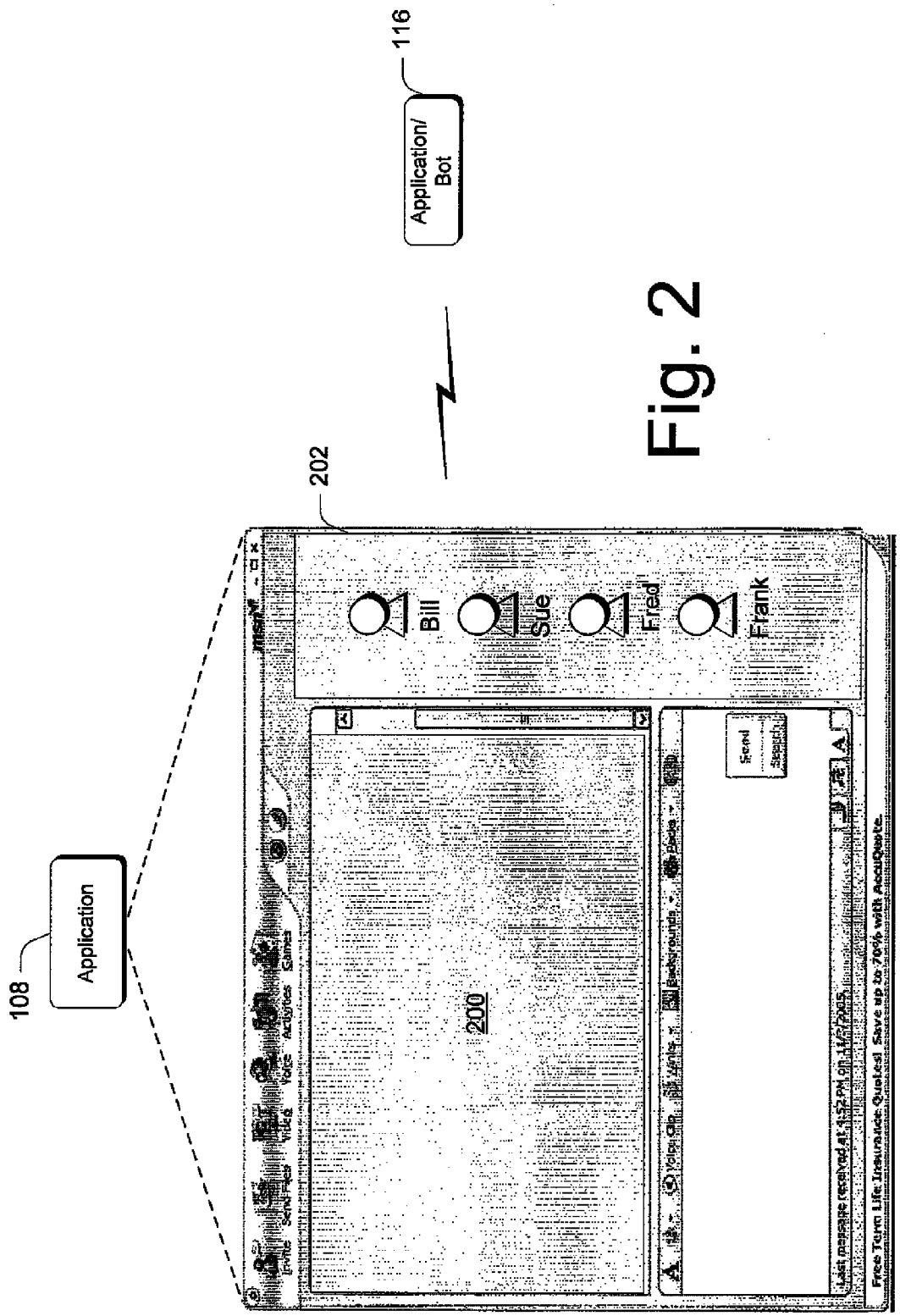
FIG. 2 illustrates an exemplary application in the form of an instant messaging application that exposes a conversation window, and an application/bot in accordance with one embodiment.

Although not required in order to communicate with a bot, in at least some embodiments, a bot can be added to a user's contact list and can reside on the contact list just like human users the user has added. In this context, a bot might have a name, personal display picture, persona or presence. Once added to the user's contact list, any time that the user is online, they can engage the bot if the bot is online as well. Typically, bot 116 are usually online all the time. As an example, consider FIG. 2 which illustrates, from FIG. 1, an application 108 in the form of an instant messaging application and one application/bot 116. Here, instant messaging application 108 presents, on a user's computing device, a user interface that includes a so-called conversation window 200 which permits the user to have conversations with various contacts that are online. In addition, application 108 provides a contact list 202 that lists the various contacts of a user who happen to be on line at the present time. Thus, in this example, Bill, Sue, Fred and Frank are currently on line and the user may choose to initiate a conversation with any or all of them.

Notice in this example that all of the user's contacts appear to be humans. There may be situations when, however, a user's contact or, more generally, an entity with whom the user interacts or communicates is not, in fact, a human being but rather, is a bot.

For example, assume that the user browses to a travel-related site and, by s clicking a particular link, accesses information to enable them to plan a trip. By clicking the link, the user's instant messaging application is launched and the user suddenly finds themselves in a "conversation" with travel agent "Joe Johnson". While Joe may appear human in many respects insofar as having a presence persona and being able to field and respond to questions in an intelligent way, the user may have no idea that "Joe Johnson" is actually bot. Further, the user may have no idea as to whether the bot is a legitimate bot—such as one that is legitimately associated with the travel site, or one that has other nefarious purposes in mind.

Various embodiments described below can provide various types of indicia, visual or otherwise, that can be used to identify to a user and others that they are interacting with a bot. Further, in at least some embodiments, the indicia can pertain to various types of ratings that can be assigned to bots and which can enable a user and others to assess the propriety, level and nature of their interaction with an application.

Indicia Indicating that a Contact is a Bot

In some instances, a user may not even be aware that they are interacting with a bot. Rather, they may be under the mistaken assumption that they are conversing with a human being. While this in and of itself is not necessarily dangerous, in some instances it would be more desirable to fully inform the user that they are indeed conversing with a bot.

In this embodiment, software executing at the client, server or both can ascertain whether the user is or is about to converse with a bot. If so, indicia in the form of visual indicia or otherwise (such as audible sounds) can be used to inform the user that they are conversing with a bot.

Figure 3:
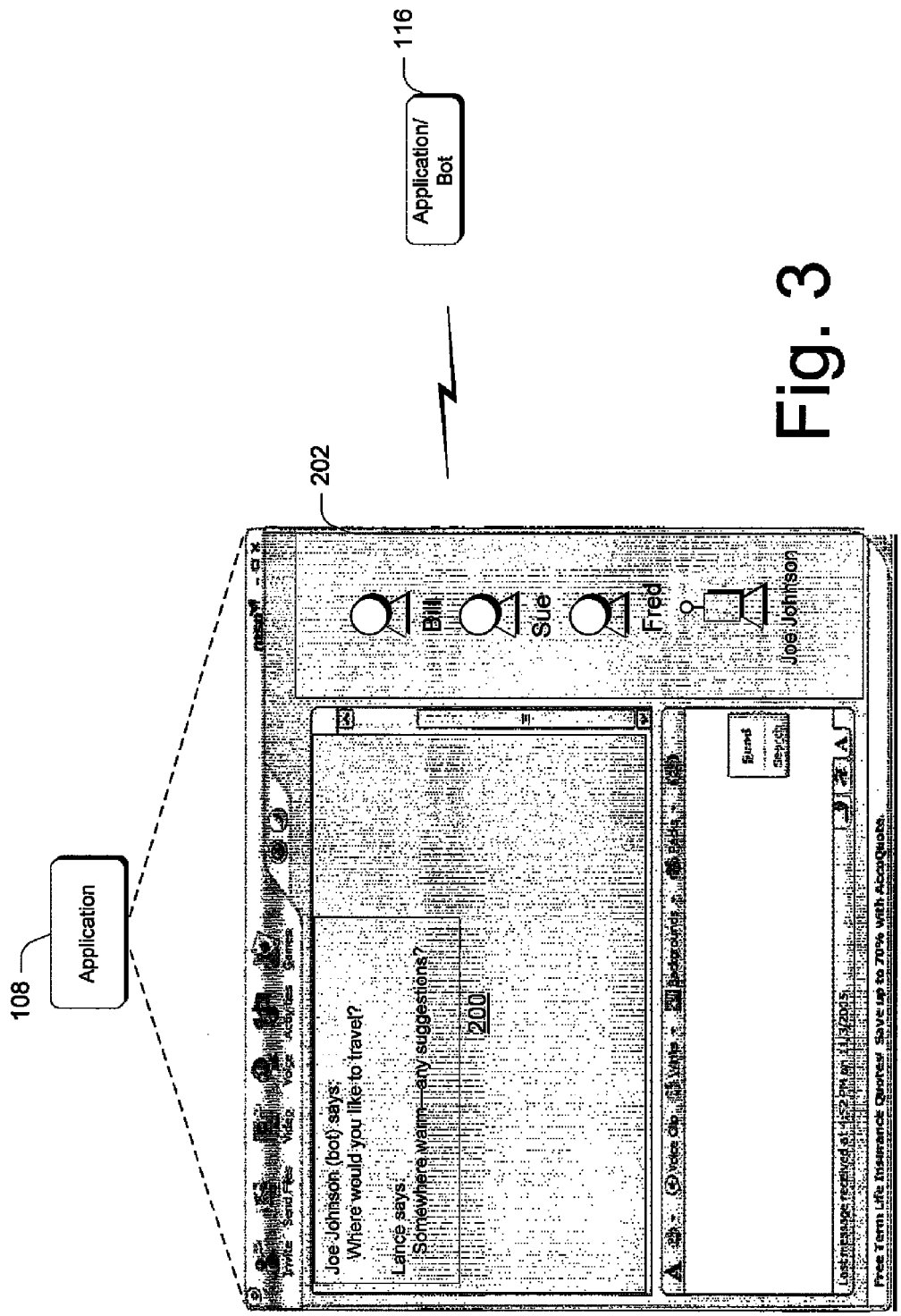
FIG. 3 illustrates an exemplary user interface and indicia in accordance with one embodiment.

As an example, consider FIG. 3. There, two different visual indicia are provided that indicate that the user is conversing with a bot. These (as well as others) can be used together or separately. In this particular example, an icon associated with "Joe Johnson" having a decidedly robotic-like appearance is provided and displayed for the user. Alternately or additionally, in the conversation window, indicia in the form of a textual representation is provided to indicate that Joe Johnson is a bot. In this example, a parenthetical "bot" is provided in the dialog to indicate to the user that they are conversing with a bot.

It is to be appreciated and understood that any suitable indicia can be used. For example, a user might configure their instant messaging application to play a short audio clip (such as a song or a verbal warning) when a conversation with a bot is or is about to be initiated.

In practice, information that indicates that a particular entity with which conversation can be had is a bot can come from any suitable location. For example, the manager of the presence-based network may have a registration database that requires registration of all bots that are used on its network. Alternately or additionally, the presence-based network may programmatically be able to detect ID's on the network that exhibit non-human traffic patterns (e.g., being on a high number of contact lists, a high rate of conversations per minute, or continuous use traffic patterns which indicate the user in fact never sleeps).

Indicia Indicating that a Bot is Approved or Verified In at least some embodiments, indicia can be provided that indicates that a particular bot is approved or verified, or that the content that the bot produces is approved in some way.

Figure 4:
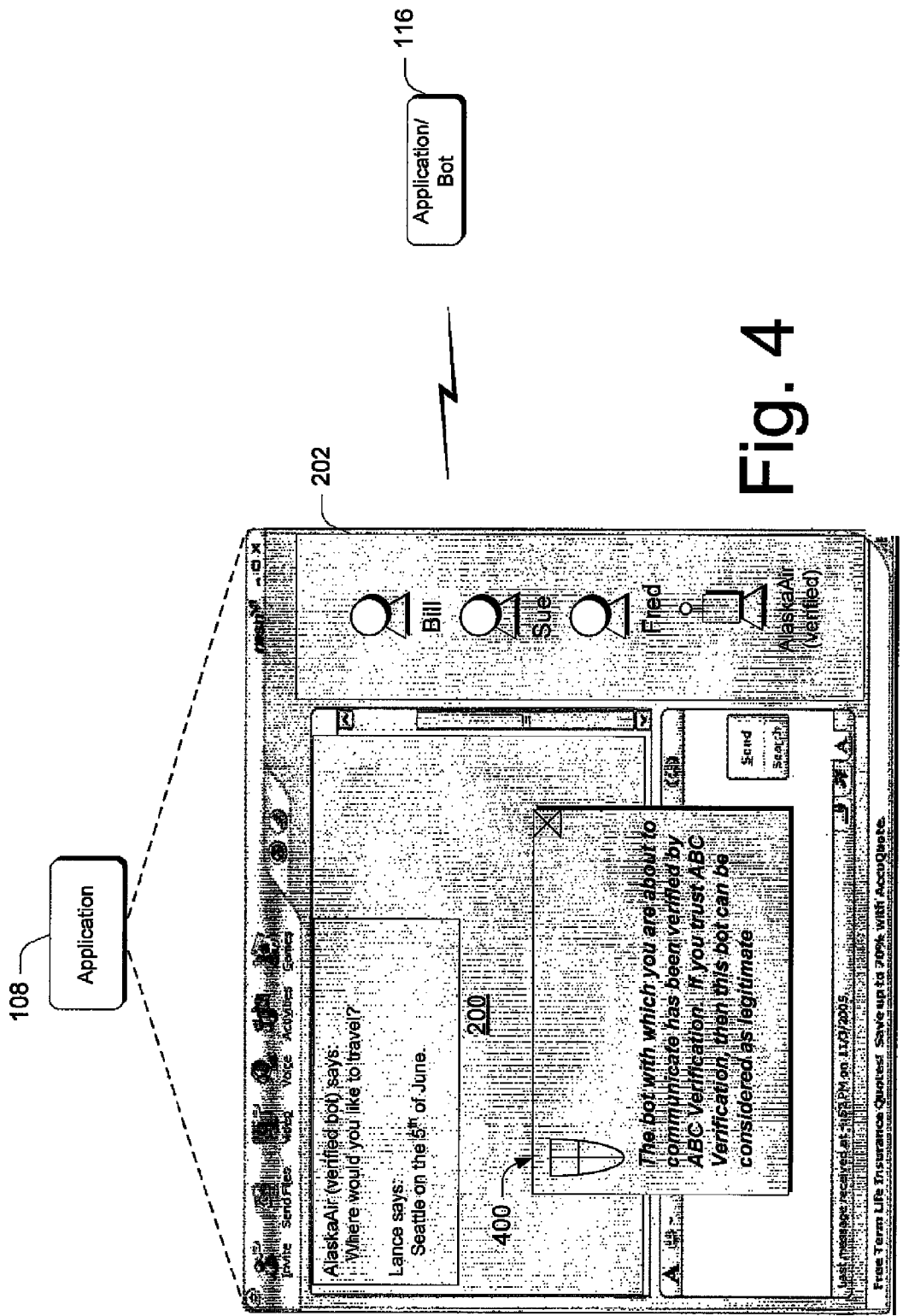
FIG. 4 illustrates an exemplary user interface and indicia in accordance with one embodiment.

More particularly, consider that a user will typically have the opportunity to engage a number of different bots. In the travel-related example above, the bot came in the form of a travel-related bot. Consider, however, that the user may, in the process of attempting to book dinner or movie reservations, engage or be engaged by a dinner or movie bot respectively. Further, in attempting to book flight reservations, the user may be engaged by a flight reservation bot. Consider also that some of these transactions may involve the user providing sensitive information, such as address, contact information, credit card information and the like. In these instances, it is desirable to be able to provide the indicia to the user that the bot is verified or approved. As an example, consider FIG. 4.

Here, the user is engaging in a conversation with a flight reservation bot for Alaska Airlines. Notice that in addition to the bot icon that appears, a parenthetical "(verified)" indication appears beneath the icon to inform the user that the bot is verified. In addition, a "(verified)" indication appears in the user's dialog.

In addition to the visual indication that appears for the user in their contact list as well as the conversation window, indicia in the form of a dialog box can be presented to the user at the initiation of the conversation that indicates to the user that the bot has been verified by a particular verifying authority. An example of such a dialog box appears at 400. Here, a verification message is provided for the user.

Figure 5:
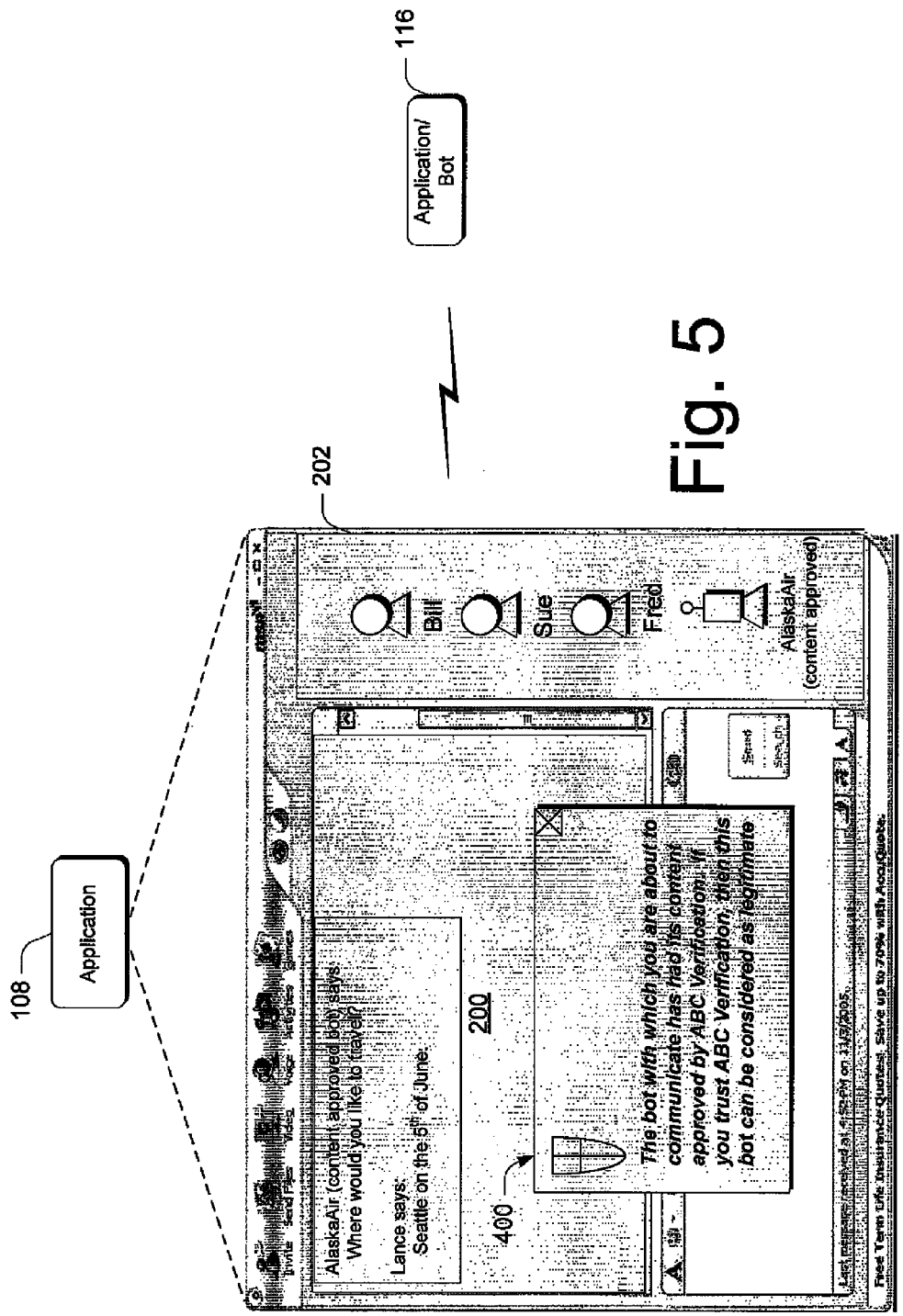
FIG. 5 illustrates an exemplary user interface and indicia in accordance with one embodiment.

Alternately or additionally, indicia can be provided to indicate to the user that the bot's content has been approved. As an example, consider FIG. 5. There, indicia is provided that indicates that the bot's content has been approved. These indicia can reside in forms that are the same as or similar to those mentioned just above.

Indicia Indicating Content Ratings Associated with a Bot

Figure 6:
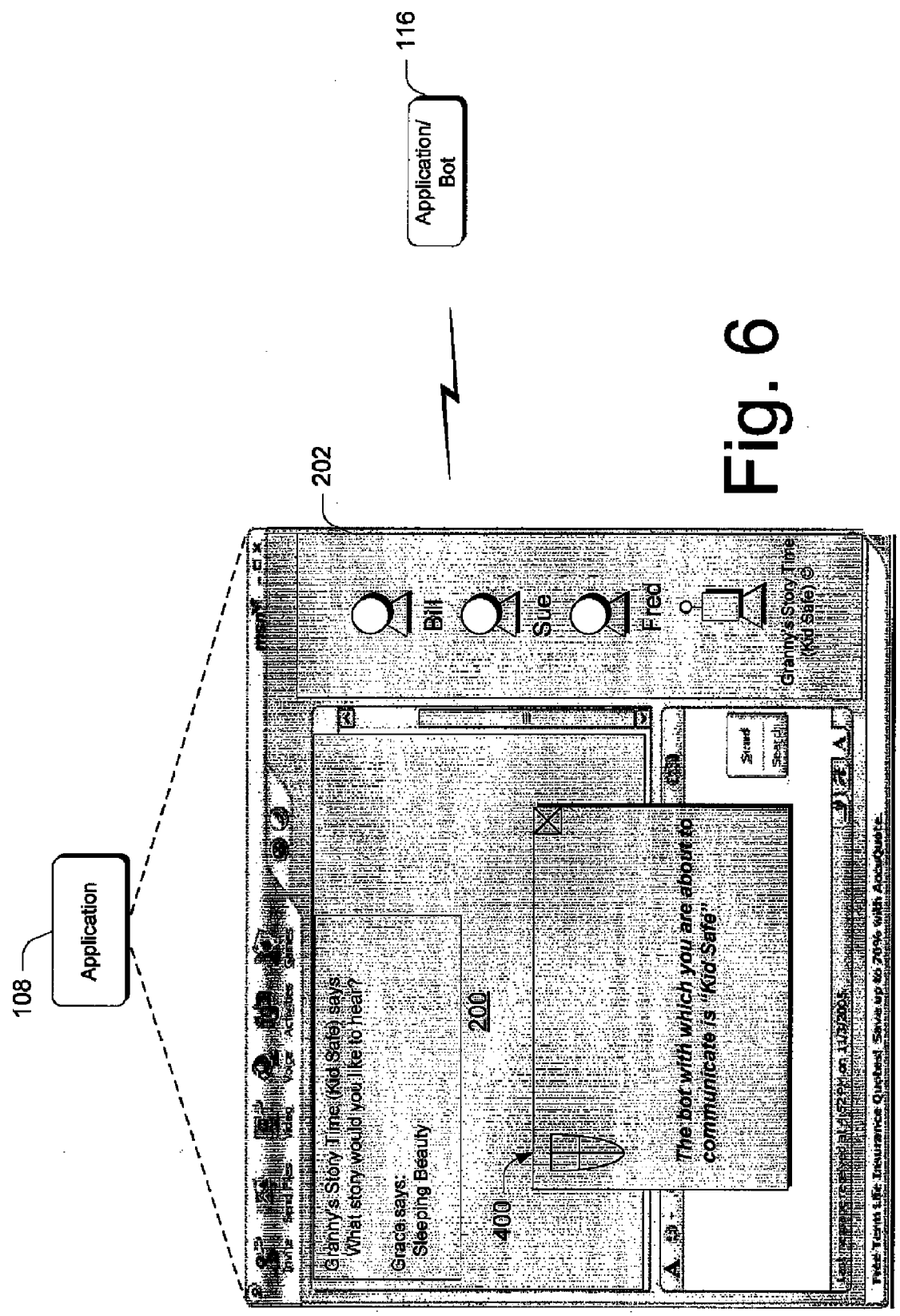
FIG. 6 illustrates an exemplary user interface and indicia in accordance with one embodiment.

In at least some embodiments, indicia can be provided that indicates various content ratings associated with a particular bot. Any suitable rating system can be utilized. For example, ratings might include, by way of example and not limitation, "adult/mature", "Teen/PG", "Kid Safe". As an example, consider FIG. 6. There, indicia is provided to indicate to the user particular content ratings associated with a bot.

In this particular example, the bot is named "Granny's Story Time" and its content rating is reflected in a number of different ways. For example, textual and/or iconic representation is shown in the contact list. Alternately or additionally, textual representation is provided in the conversation window 200. Alternately or additionally, indicia in the form of a dialog box 400 can be provided.

It is to be appreciated and understood that ratings in this manner can further be used by other applications (client or server side), such as filtering applications, to allow and disallow bots having particular content ratings. For example, Grace's parents may have set up a filter that disallows conversations between Grace and bots having content ratings other than "Kid Safe".

Indicia Indicating Privacy Ratings Associated with a Bot

Figure 7:
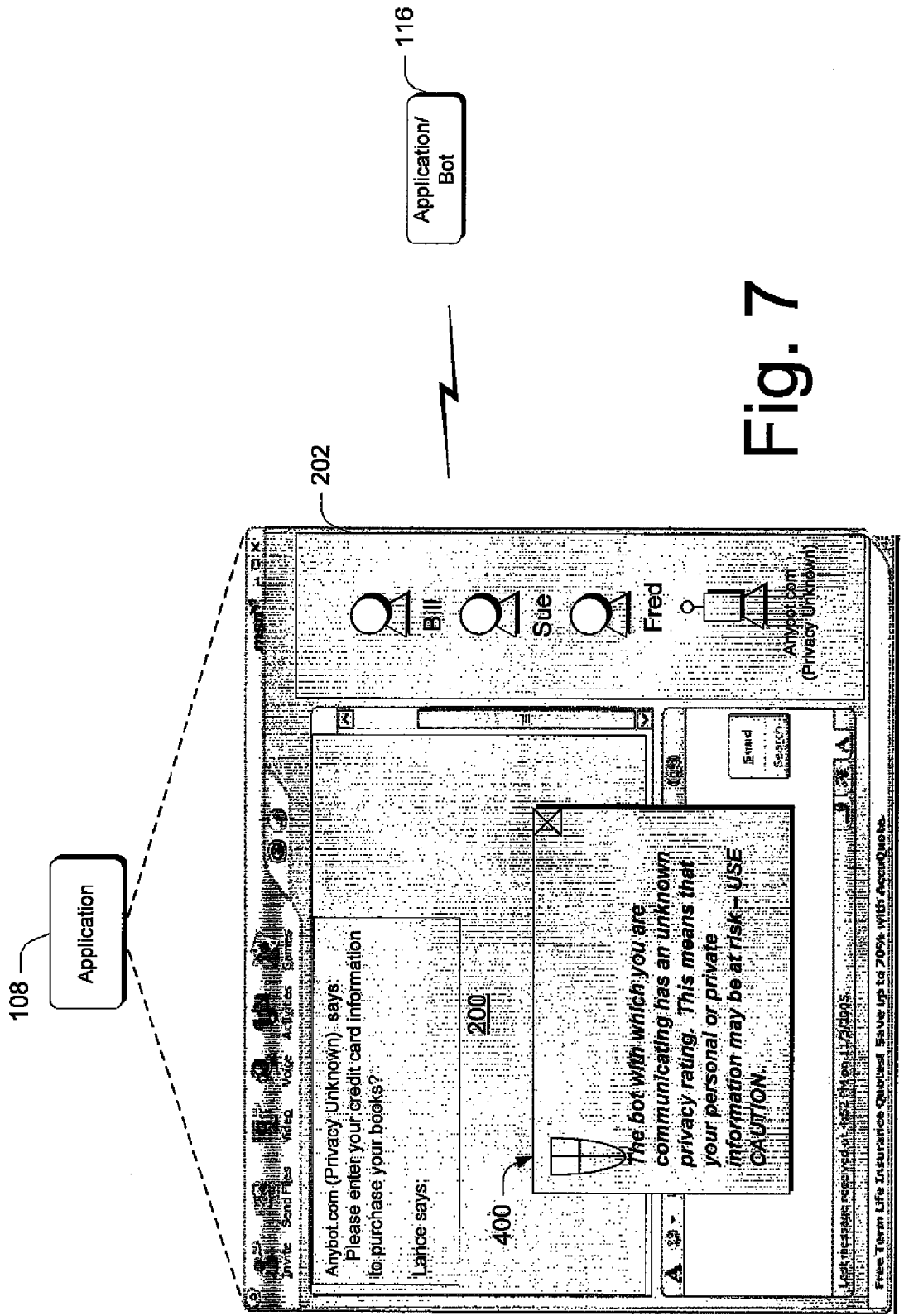
FIG. 7 illustrates an exemplary user interface and indicia in accordance with one embodiment.

In at least some embodiments, indicia can be provided that indicate privacy ratings associated with a particular bot. For example, a user may engage in a transaction in which the bot asks for certain personal information, such as the usert's address or credit card numbers. In this instance, a privacy rating can help the user appreciate whether or not their information is going to be safe or shared. As an example, consider FIG. 7.

There, indicia is provided to indicate to the user a rating associated with the bot Anybot.com. In this particular instance, the privacy rating is unknown and the user is advised accordingly. Other privacy ratings can include, by way of example and not limitation, "Safe" and "Unsafe". Further, indicia can come in any suitable form such as iconic, textual and the like.

Indicia Indicating Reputation Ratings Associated with a Bot

In at least some embodiments, indicia can be provided that indicates a reputation associated with a particular bot. For example, through reactive feedback from other users, bots can be assigned individual reputation ratings that describe in some way the perceived or actual reputation of a bot. The reputation can be a function of the cumulative time legitimate users spend with the bot. In this manner, "good" bots will have good engagement models with the users who, in turn, will spend a number of minutes on a regular basis in discourse with the bot.

Figure 8:
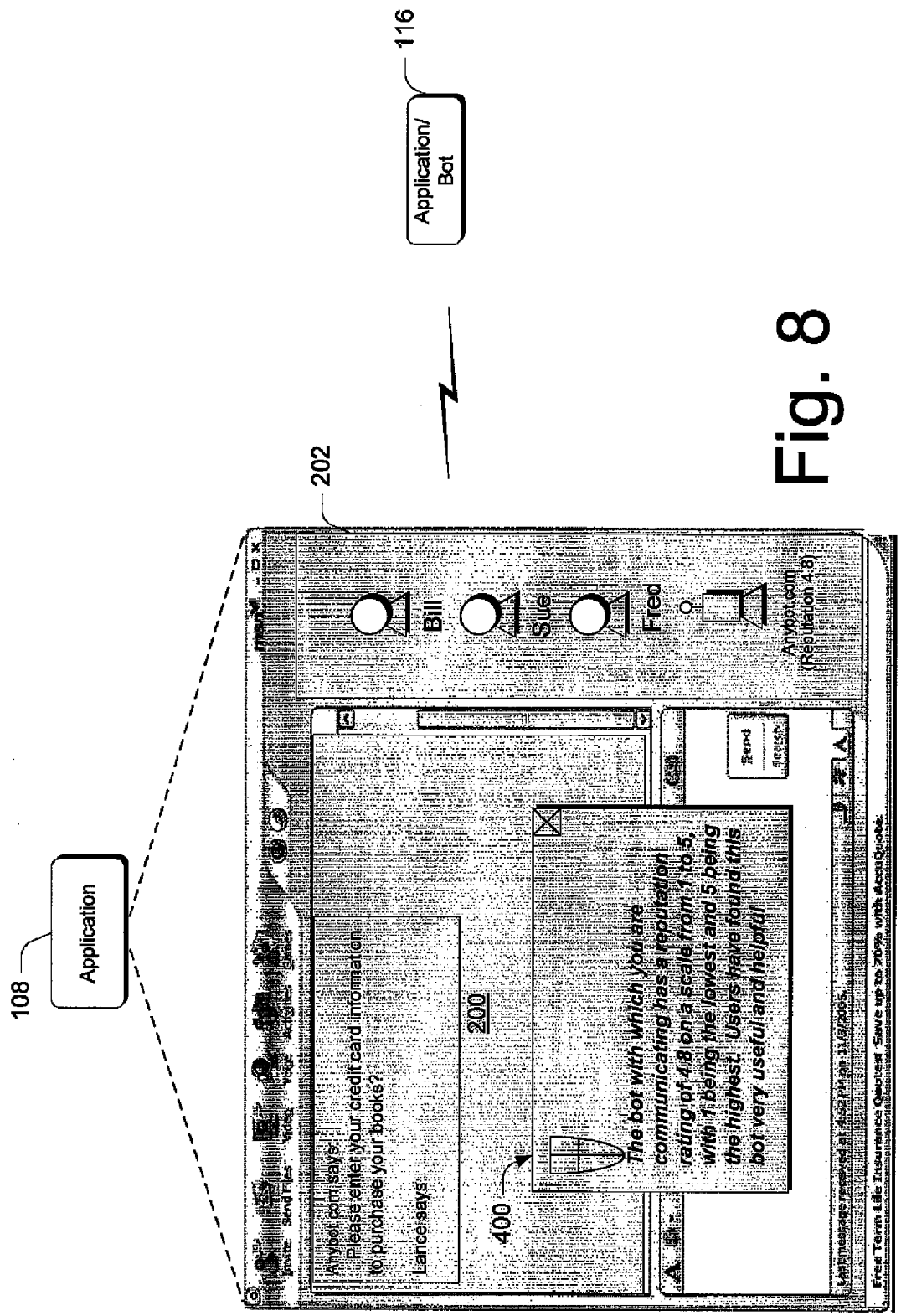
FIG. 8 illustrates an exemplary user interface and indicia in accordance with one embodiment.

For example, if over time users tend to enjoy their interaction with a particular bot and find it helpful and useful, they may provide it with a reputation rating that reflects its overall utility as perceived by others. Alternately, if the bot is generally perceived by others as not very helpful or otherwise undesirable for some reason, its reputation indicia may reflect this. As an example, consider FIG. 8.

There, the Anybot.com bot has been assigned a reputation rating of 4.8 on a scale of 1 to 5. This indicia can be presented to the user in a couple of different ways. First, this indicia can be presented in the contact list as indicated. Second, a dialog box such as that shown at 400 can be provided for the user. It is to be appreciated and understood that other indicia can be provided without departing from the spirit and scope of the claimed subject matter.

Indicia Indicating Popularity of a Bot

In at least some embodiments, indicia indicating the popularity of a particular bot can be provided. Any suitable type of indicia can be used and can be based on any suitable popularity metric.

By way of example and not limitation, such metrics can include the bot's user base, breadth of use, time on the network, and/or average time spent conversing with the bot. In addition, relative changes in a bot's popularity rating can be shown over time. For example, if a bot's popularity gradually drops off, indicia of this can be provided to the user.

Figure 9:
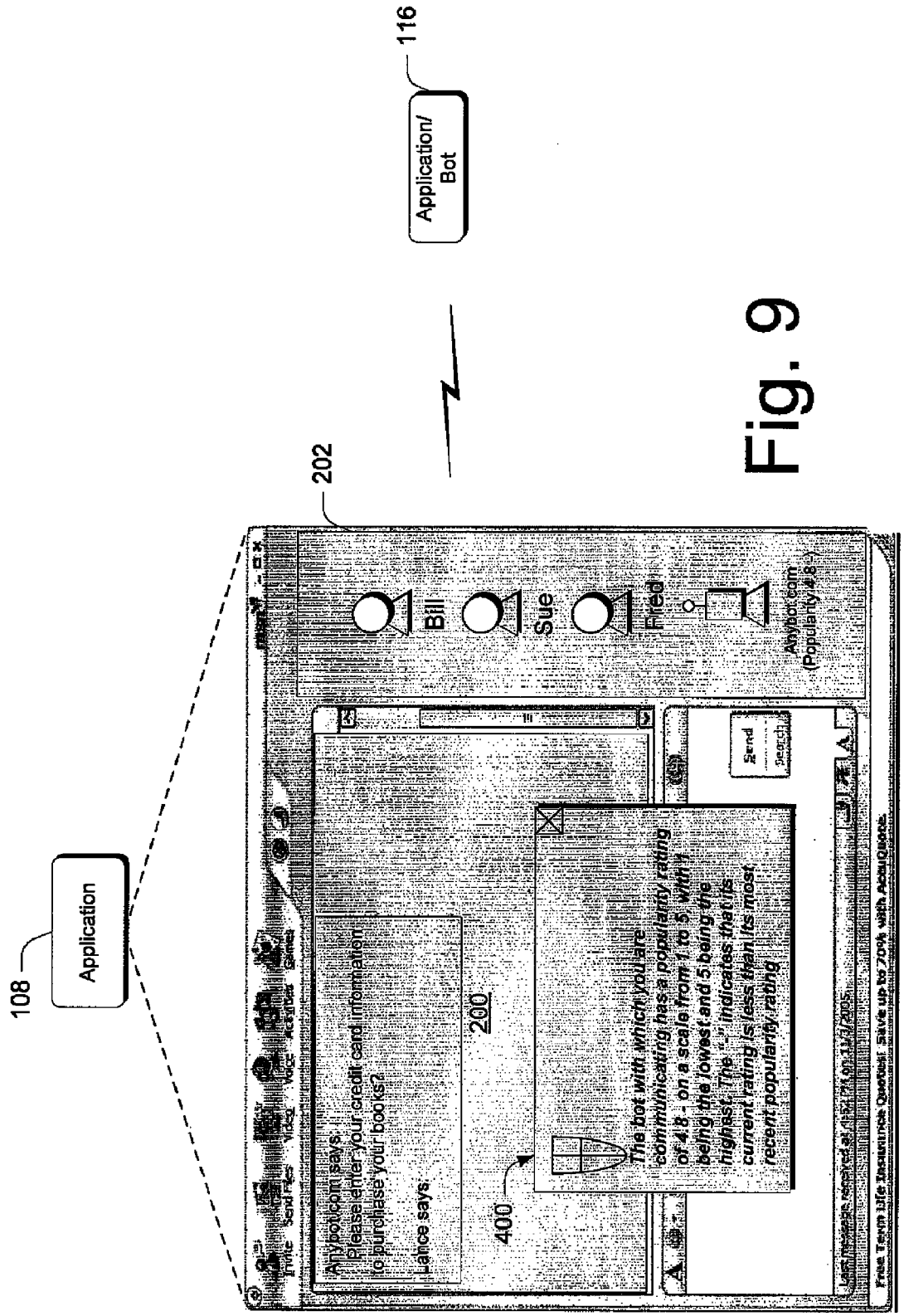
FIG. 9 illustrates an exemplary user interface and indicia in accordance with one embodiment.

As an example, consider FIG. 9. There, the Anybot.com bot has a popularity rating of "4.8–" on a scale from 1 to 5. The "–" indicates that the bot's popularity recently dropped.

In the above examples, various types of indicia are described. It is to be appreciated and understood that other indicia can be used without departing from the spirit and scope of the claimed subject matter. By way of example and not limitation, the indicia can be reflected in the chrome of the application as well as in other ways. For example, the indicia can reside in the form of sound that is generated upon interaction with a hot. Further, indicia can be provided in the form of introductory text that identifies a bot. Alternately or additionally, indicia in the form of representative icons, fonts, background images and the like can be used. Other indicia can include, by way of example and not limitation, the shape of the client window, having client enforced naming conventions, visual blinking and the like. In some instances, some devices could emit different colors (e.g. a phone screen lights up and glows blue, etc.). Alternately or additionally, the indicia can reside in the manner in which the typing or text appears for the user. For example, character by character typing can be used for a bot, rather than the seemingly instant appearance of responses.

Expressing Indicia Programmatically for Use by other Applications

In at least some embodiments, the indicia described above can be expressed programmatically so that the client application (e.g. the instant messaging application), third party clients or applications, as well as other applications are able to interact with and take actions based upon the expressed ratings. As an example, consider the following.

Suppose that a particular bot is content rated "adult/mature". This rating information (as well as other rating information) can be associated with the bot such that applications executing on the client device can take appropriate actions. For example, parents may opt to set up a filter that filters bots based on their content rating. As set forth in this particular example, this functionality can be employed in the context of family safe settings which give parents powerful tools to use in managing and controlling content on their desktop home device Managed IDs In at least some embodiments, the concept of managed IDs can be utilized to provide a mechanism by which users can validate and verify various bots. For example, the manager of a presence platform can create, control and distribute IDs in a certain domain space. Only authorized applications can receive these managed IDs. By having a managed ID, the application or bot carries with it a representation that it has been approved, in some manner, by the issuing authority. This managed ID can then be used to implement the various embodiments described above. For example, a managed ID might be associated in a database with all of the ratings described above. In this manner, when a user engages a bot, the managed ID can be used as an index into the database to retrieve and display relevant rating information. A specific visual set of actions could be performed client side for ID's within as specified managed domain.

Having described various ratings and examples of indicia that can be provided to a user, consider an exemplary system that can be utilized in accordance with one implementation. It is to be appreciated that the description that follows constitutes but an example and that other systems can be utilized without departing from the spirit and scope of the claimed subject matter.

Exemplary System

Figure 10:
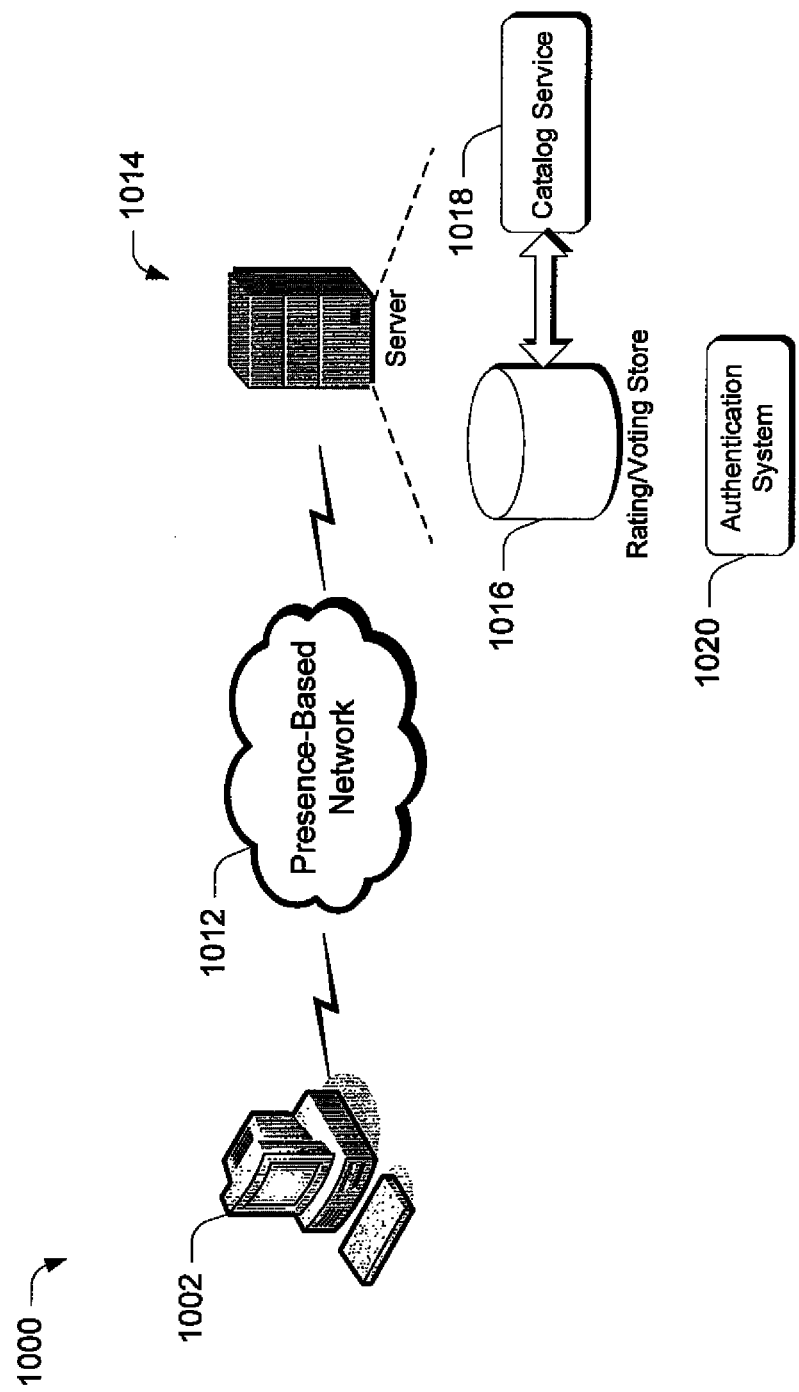
FIG. 10 illustrates an exemplary system in accordance with one embodiment.

FIG. 10 illustrates an exemplary system generally at 1000 in accordance with one embodiment. System 1000 includes one or more client computing device 1002 such as the one described above. In addition, a presence-based network 1012 is utilized to enable applications executing on the computing device to communicate with one or more servers 1014 that implement, at least in part, the presence environment as described above.

In this example, server 1014 includes or otherwise has access to a rating/voting store 1016, a catalog service 1018 and an authentication system 1020.

In this example, rating/voting store 1016 is utilized to store ratings and/or voting information associated with individual bots that operate within the presence environment. For example, a registration process might register individual bots and then create, in store 1016, entries for the bot that describe the individual bot's ratings. Further, in at least some embodiments, reactive feedback from users can be received and maintained in the store 1016. For example, users might vote over time on the usefulness or popularity of a particular bot. This information can be maintained in the store and provided to various client devices when a user engages a particular bot.

Catalog service 1018 can provide a catalog of bots with their associated ratings and voting information (i.e. feedback information), as well as any other comprehensive information that might be useful to users and others. The catalog service might then be used by users to browser for various bots, conduct searches of relevant bots and add those bots to their contact list.

Authentication system 1020 can be used to identify a user as well as a bot when communication has commenced and when feedback is provided or required.

Exemplary Method

Figure 11:
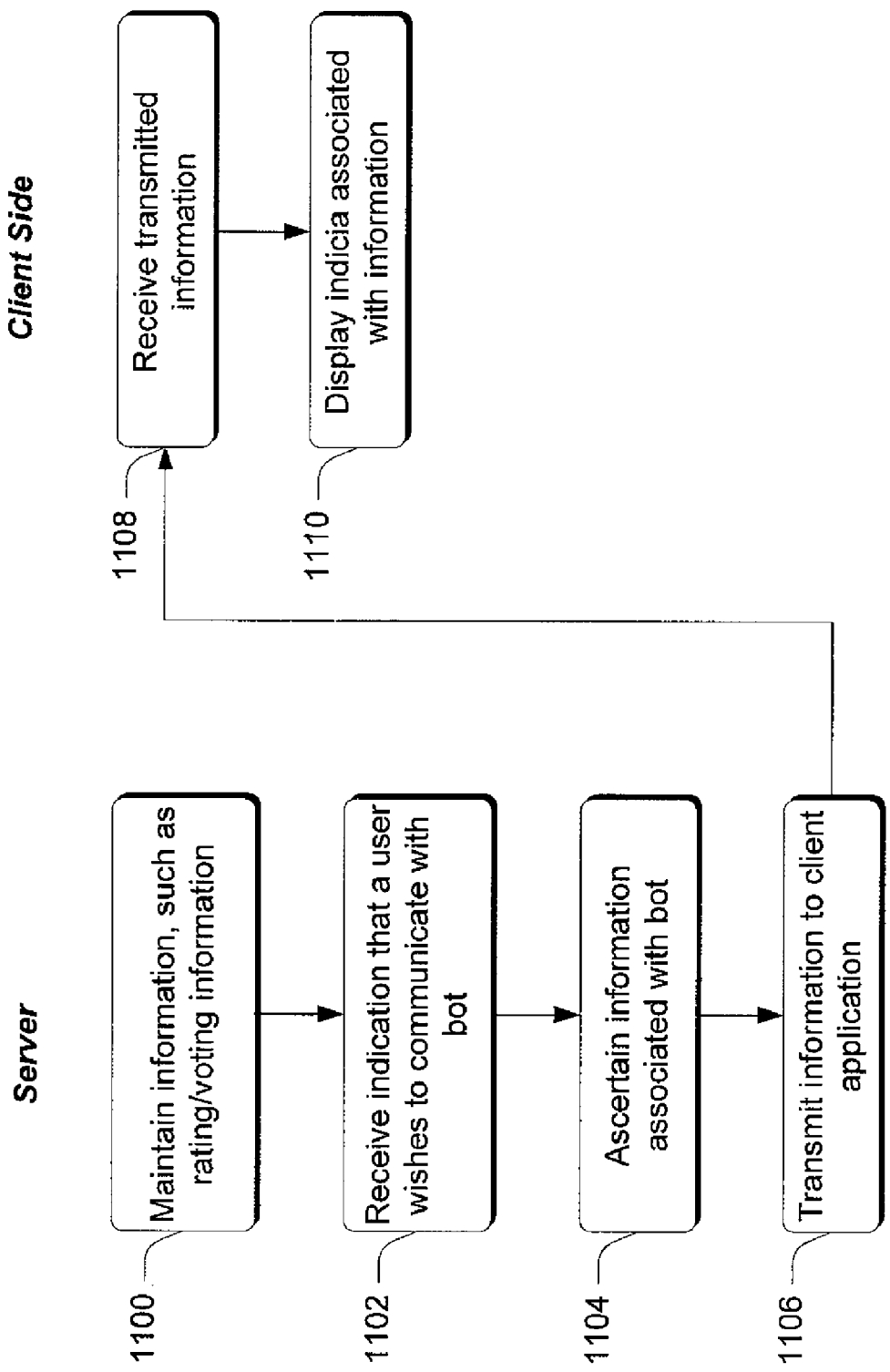
FIG. 11 is a flow diagram that illustrates steps in a method in accordance with one embodiment.

FIG. 11 is a flow diagram that describes steps in a method in accordance with one embodiment. The method can be implemented in connection with any suitable hardware, software, firmware or combination thereof. In but one embodiment, the method can be implemented in connection with systems such as those described above. In at least some embodiments, various methodical steps or acts are implemented by computer-readable instructions that reside on some form of computer-readable media.

In the description that follows, various steps or acts are depicted as being performed by a server, such as one that resides in and/or implements a presence environment, and a client or client application.

Step 1100 maintains information, such as rating/voting information, associated with one or more bots. This information can comprise any suitable type of information that may be useful to the user. Step 1102 receives an indication that a user wishes to communicate with a bot. Any suitable type of indication can be provided. Step 1104 ascertains information, such as the rating/voting information, associated with a particular bot of interest. This step can be performed by accessing a suitably configured catalog service or data store that holds the information. Step 1106 transmits the information to the client application. Any suitable method, means and/or protocol can be used to transmit this information to the client application.

Step 1108 receives the transmitted information. This step is performed by the client device. Step 1110 displays indicia associated with the information. Examples of indicia associated with the information, as well exemplary user interfaces are provided above. For example, such indicia might be that the entity with which communication is desired is, in fact, a bot. Alternately or additionally, such indicia can be indicia associated with a particular rating of the bot, such as the indicia described above.

CONCLUSION

Various embodiments employ methods and techniques to enable users, and others, to manage or otherwise become more informed about applications or bots with which they interact. The methods and techniques, in at least some embodiments, can provide various types of indicia, visual or otherwise, that pertains to various types of ratings that can be assigned to applications or bots and which can enable a user and others to assess the propriety, level and nature of their interaction with an application or bot.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. One or more computer-readable storage media embodying computer-readable instructions which, when executed by one or more processors, cause the one or more processors to implement a method comprising:

detecting non-human traffic patterns of a contact identifier in a presence based environment, wherein detecting non-human traffic patterns includes detecting at least one member of a group comprising:
a high number of contact lists associated with the contact identifier, a high rate of conversations per minute for the contact identifier, and
continuous traffic patterns of the contact identifier;
based on the detecting, associating the contact identifier with a bot;
ascertaining that a user is or is about to converse with the bot;
presenting, in a user interface, a first indicia that the user is or is about to converse with the bot as compared to a human user; and
presenting in a user interface, a second indicia that the bot is approved or verified, wherein the second indicia is presented proximate to an icon which represents the bot in a user contact list and the second indicia includes textual indicia which represents that the bot is approved or verified.

2. The one or more computer-readable media of claim 1, wherein the first indicia comprises iconic indicia.

3. The one or more computer-readable media of claim 1, wherein the first indicia comprises textual indicia.

4. The one or more computer-readable media of claim 1, wherein the first indicia comprises non-visual indicia.

5. The one or more computer-readable media of claim 1, wherein said user interface comprises part of an instant messaging or VoIP application user interface.

6. The one or more computer-readable media of claim 1, wherein said user interface comprises part of an interface that enables the user to have real-time conversations.

7. The one or more computer-readable media of claim 1, wherein the textual indicia which represents that the bot is approved or verified is presented in a user dialog box.

8. The one or more computer-readable media of claim 1 wherein presenting indicia includes providing indicia that indicates that a content of the bot is approved.

9. The one or more computer-readable media of claim 1 wherein presenting indicia includes providing indicia that indicates content ratings associated with the bot.

10. The one or more computer-readable media of claim 1 wherein presenting indicia includes providing indicia that indicates a privacy rating associated with the bot.

11. The one or more computer-readable media of claim 1 wherein presenting indicia includes providing indicia that indicates a reputation associated with the bot, wherein said reputation is a function of the cumulative time users spend with the bot.

12. The one or more computer-readable media of claim 1 wherein presenting indicia includes providing indicia that indicates popularity of the bot, wherein the popularity of the bot is based on a popularity metric, wherein the popularity metric includes one or more members of a group comprising: a user base of the bot, breadth of use of the bot, length of time of the bot on a network, and an average time users spend conversing with the bot, wherein the indicia indicating popularity is configured to show relative changes in the popularity of the bot over time.

13. One or more computer-readable storage media embodying computer-readable instructions which, when executed by one or more processors, cause the one or more processors to implement a method comprising:
  detecting non-human traffic patterns of a contact identifier in a presence based environment, wherein detecting non-human traffic patterns includes detecting at least one member of a group comprising: a high number of contact lists associated with the contact identifier, a high rate of conversations per minute for the contact identifier, and continuous traffic patterns of the contact identifier;
  based on the detecting, associating the contact identifier with a bot indicator;
  ascertaining that a user is or is about to converse with the contact identifier in a presence-based environment;
  receiving rating information associated with the contact identifier from a rating store;
  providing a first indicia to the user associated with the contact identifier, the first indicia including the bot indicator and a rating indicia that can be presented in a user interface to indicate a rating of the rating information associated with the contact identifier; and
  providing a second indicia that the bot is approved or verified, wherein the second indicia is presented proximate to an icon which represents the bot in a user contact list and the second indicia includes textual indicia which represents that the bot is approved or verified.

14. The one or more computer-readable media of claim 13, wherein the method further comprises expressing said rating indicia programmatically so that other applications can take actions based on the rating information.

15. The one or more computer-readable media of claim 13, wherein the contact identifier is associated with a managed identifier, wherein the managed ID is distributed by an issuing authority to the bot as an authorized bot, wherein the issuing authority creates and controls the managed ID, wherein the managed ID is used as an index to a database to retrieve and display rating information associated with the bot.

16. The one or more computer-readable media of claim 13, wherein the first indicia comprises textual indicia.

17. The one or more computer-readable media of claim 13, wherein the first indicia comprises textual indicia that is presented with iconic indicia that indicates that the bot is a bot component.

* * * * *